United States Patent [19]

Quarton

[11] 4,220,905
[45] Sep. 2, 1980

[54] BATTERY CHARGER

[75] Inventor: William T. Quarton, Englewood, Colo.

[73] Assignee: Honeywell Inc., Minneapolis, Minn.

[21] Appl. No.: 919,698

[22] Filed: Jun. 27, 1978

[51] Int. Cl.$^2$ .............................................. H02J 7/00
[52] U.S. Cl. ........................................ 320/39; 320/23; 320/DIG. 1
[58] Field of Search ................................... 320/20–23, 320/39, 40, DIG. 1

[56] References Cited

U.S. PATENT DOCUMENTS

| | | |
|---|---|---|
| 3,517,294 | 6/1970 | Ruben . |
| 3,531,706 | 9/1970 | Mullersman . |
| 3,553,562 | 1/1971 | Woods . |
| 3,602,794 | 8/1971 | Westhaver ......................... 320/22 X |
| 3,659,181 | 4/1972 | Bembenek ......................... 320/39 X |
| 3,699,422 | 10/1972 | Miller et al. . |
| 3,919,618 | 11/1975 | Coleman et al. ................... 320/23 X |

OTHER PUBLICATIONS

Intersil Products Catalog-Circuit Description ICL8211, ICL8212, pp. 63–72.
Gates Battery Appl. Manual, pp. 36, 37, "Two Step Constant Current Chargers."

Primary Examiner—Robert J. Hickey
Attorney, Agent, or Firm—L. J. Marhoefer; L. D. Burton

[57] ABSTRACT

A battery charging circuit includes a switching transistor which controls the flow of charging current to the battery at a high rate or a low rate. The operation of the transistor is, in turn, controlled by a voltage sensing circuit which includes a voltage detector module characterized in a very low current drain. The battery is, in fact, isolated from the charging circuit by a diode; the sensing circuit, however, is not isolated from the battery by a diode. This arrangement permits a more sensitive voltage detection and a more accurate control over the switching transistor. A desirable switching hysteresis is built into the sensing circuit but is operable to allow the hysteresis loop to be eliminated for purposes of calibration.

7 Claims, 1 Drawing Figure

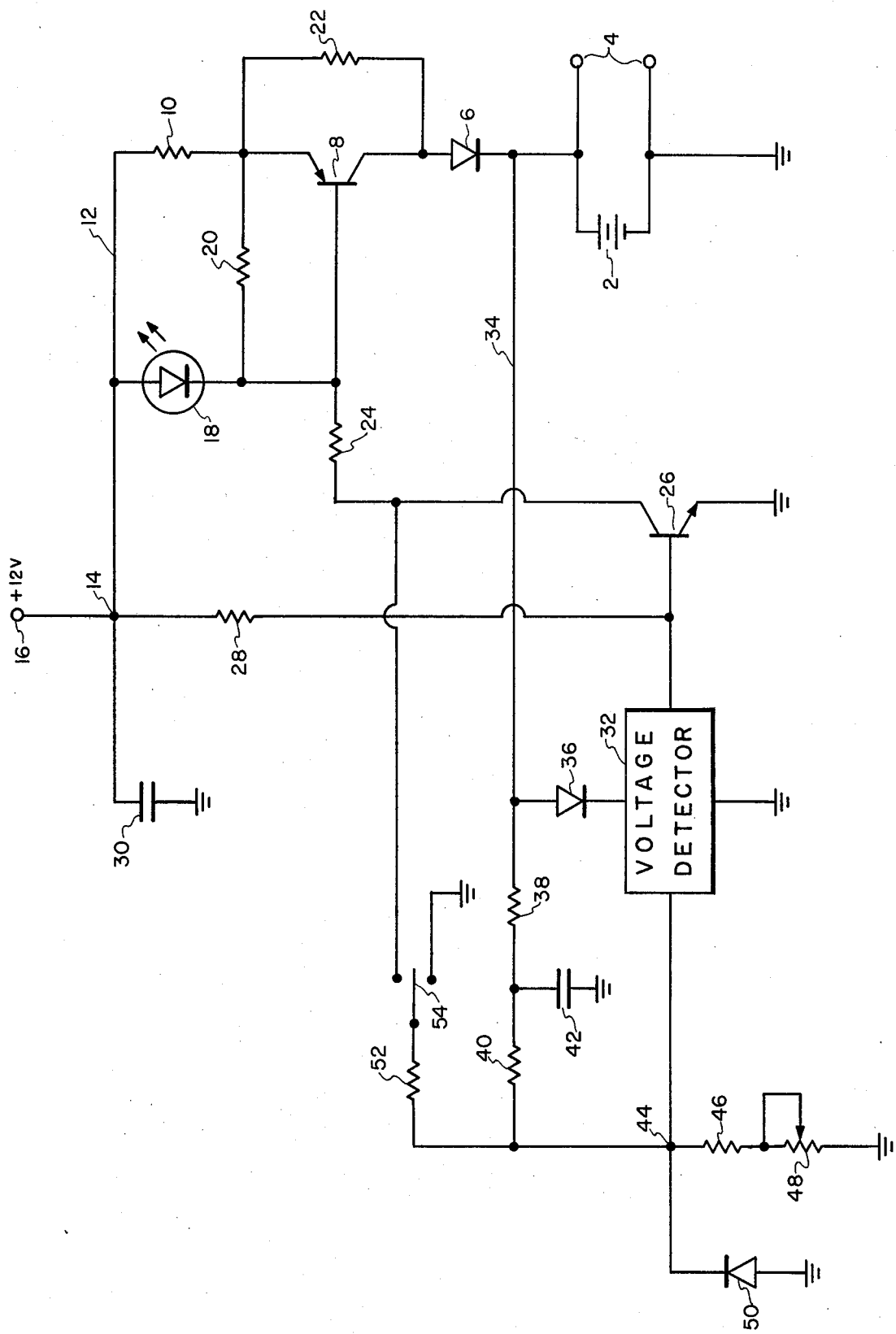

BATTERY CHARGER

BACKGROUND OF THE INVENTION

The present invention relates to battery chargers. More particularly, it relates to a two-mode battery charger. In the art relating to computers, especially so-called microcomputers, vital data for the operation of the computer is stored in a memory device. Certain of these memory devices require that the energizing electrical power be applied to the memory device to maintain the data stored therein. In such devices, a loss of energizing power would also cause a loss of the stored data. In order to avoid such a loss of data, there have been provided back-up battery power supplies to maintain the energization of the memory devices when the principal power supply has failed. It has also been found desirable to provide a battery charging circuit to maintain the charge on the back-up battery to assure its availability to sustain the energization of a memory wherein, when the battery voltage is below a predetermined value, a relatively heavy charging current will be applied until the charge on the battery reaches a second predetermined value; then the charger shifts to a trickle charge mode wherein a lower value current is imposed upon the battery to maintain its high level state of charge. In some of the previous charging circuits, the charging current has been in the form of unidirectional pulses of current derived from the phase control of a silicon controlled rectifier. In others, it is necessary to isolate the battery being charged from the charging circuit by way, for example, of a diode to prevent the battery current from being fed back into the charging circuit during intervals when the charging circuit is non-operative such as, for example, when the primary power supply has failed. The isolation of the battery from the charging circuit includes an isolation of the sensing circuit which would control the operation of the charger. In both of these previous types of circuits, substantial disadvantages and irregularities are encountered.

SUMMARY OF THE INVENTION

It is, accordingly, an object of the present invention to provide an improved battery charger which obviates the shortcomings of those heretofor presented.

It is another object of the present invention to provide an improved battery charger as set forth characterized in a two mode operation.

It is a further object of the present invention to provide an improved battery charger as set forth which is relatively simple in construction and highly stable and accurate in operation.

In accomplishing these and other objects, there has been provided, in accordance with the present invention, the battery charging circuit wherein a switching transistor controls the flow of charging current to the battery. The operation of the transistor is, in turn, controlled by a voltage sensing circuit which includes a voltage sensing module characterized in a very low current drain. The battery is, in fact, isolated from the charging circuit by way of a diode, however, the sensing circuit is not isolated from the battery by the diode. This arrangement permits a more sensitive voltage detection and a more accurate control over the switching transistor. A desirable switching hysteresis is built into the sensor but allowing the hysteresis loop to be eliminated for purposes of calibration of the operation of the battery charger.

BRIEF DESCRIPTION OF THE DRAWINGS

A better understanding of the present invention may be had from the following detailed description when read in the light of the accompanying drawing in which:

The single FIGURE is a schematic diagram of a battery charging circuit embodying the present invention.

DETAILED DESCRIPTION

Referring now to the drawing in more detail, there is shown a battery 2 which may be used, for example, to energize a memory device on a standby basis. The memory device and its associated control circuit may be connected to the output terminals 4. One terminal of the battery 2 is connected directly to ground. The positive terminal of the battery is connected through a diode 6 to the collector of a transistor 8. The emitter of the transistor 8 is connected through a resistor 10 and a lead 12 to a junction 14 thence to a positive power supply terminal 16. The lead 12 is connected to the anode of a light emitting diode 18, the cathode of which is connected to the base of the transistor 8 and through the resistor 20 to the emitter of the transistor 8. A resistor 22 is connected across the emitter collector path of the transistor 8. The cathode of the diode 18 is also connected through a resistor 24 to the collector of a transistor 26. The emitter of the transistor 26 is connected to ground. The junction 14 from the power supply terminal 16 is connected through a resistor 28 to the base electrode of the transistor 26. The smoothing capacitor 30 is connected between the junction 14 and ground.

A voltage detector 32 is a module which, in the illustrative embodiment is identified as an ICL 8212 manufactured and sold by Intersil. The voltage detector module is characterized in having a very low current drain, a very high input impedance and an accurate response to signals applied at the input terminal thereof. The output of the voltage detector is in the nature of an open collector type output. A lead 34 from the positive terminal of the battery 2 is connected through a diode 36 to the energizing input terminal of the voltage detector 32. The other energizing terminal of the voltage detector module 32 is connected to ground. The lead 34 is further connected through a resistor 38 and a resistor 40 to the signal input terminal of the voltage detector 32. A filter capacitor 42 is connected from the junction between the resistors 38 and 40 to ground. The end of the resistor 40 remote from the resistor 38 is also connected at a junction 44 to a series connected resistor 46 and an adjustable resistor 48 thence to ground. A diode 50 connected between junction 44 and ground serves as a limiting clamp. The junction 44 is also connected through a resistor 52 to the armature of a switch 54, one fixed terminal of which is connected to ground, the other fixed terminal of which is connected to the collector of the transistor 26.

In considering the operation of the apparatus shown in the FIGURE, let it be first assumed that the switch 54 is closed with the armature engaging the grounded contact. The grounding of the armature of the switch 54 actuates the output of the voltage detector from the input thereof, thereby, as will be seen hereinafter, removing the hysteresis feature for purposes of allowing the apparatus to be properly calibrated. As was mentioned above, when the charge on the battery is above a predetermined point, there will be a trickle charging current applied thereto to maintain the charge on the battery. Let it be assumed that the trip-point for that charge is represented by 7.50 volts at the battery terminals. The series train of resistors including the resistor 38, 40, 46 and 48 produce a signal at the junction 44 which is slightly above the required threshold voltage for the input terminal of the voltage detector 32. That voltage has been established at substantially 1.1 volt. When the input voltage applied to the input terminal of the voltage detector exceeds the threshold voltage, the output terminal, an open collector construction, is clamped to ground. With the output terminal of the voltage detector at ground, the transistor 26 is turned off. Turning off the transistor 26 removes the base drive for the transistor 8 causing that transistor to be turned off as well as turning off the LED 18. Under those conditions, a trickle charging current of approximately 20 milliamps flows from the positive power supply terminal 16 through the resistor 10, the bypass resistor 22 and the diode 6 into the positive terminal of the battery 2. This trickle charging current maintains the charge on the battery. When the charge on the battery diminishes to the aforementioned trip-point, the output terminal of the voltage detector goes to a logical "high", turning on the transistor 26 providing a current path from the power supply terminal 16 through the LED 18 and the resistor 24. This provides base drive current for the transistor 8, turning that transistor on. That allows current to flow from the power supply terminal 16 through the resistor 10, the transistor 8 and the diode 6 into the positive terminal of the battery 2 at a higher charging rate which may, for example, be 0.9 amps. The voltage trip-point for actuating the voltage detector may be established by adjusting the variable resistor 48. Once the upper trip-point is established, the switch 54 would then be shifted to the upper contact wherein the resistor 52 is connected between the collector of a transistor 26 and the junction 44. In the exemplary embodiment of the present invention, the resistor 52 was on the order of two megohms. The inclusion of that resistor in a feedback loop around the voltage detector introduces an element of hysteresis. Thus, when the transistor 26 is turned on, thereby enabling the turning on of the transistor 8 and introducing a high charging rate for the battery, the high end trip-point will remain at that value established by the calibration hereinbefore mentioned; with the transistor 26 turned on, the collector thereof is effectively at ground potential. When that high trip-point has been reached, however, the transistor 26 is turned off and the voltage at the collector thereof is substantially 12 volts. Under these conditions a trickled charging current is flowing into the battery 2. The 12 volts reflected across the two megohm resistor produces a current through that resistor of substantially 6 microamps. While the voltage developed across the resistors 46 and 48 necessary to establish the threshold voltage of 1.1 volts at the input of the voltage detector remains the same, the necessary current through the resistors 38 and 40, derived from the battery voltage, is reduced by the amount of the current flowing through the resistor 52. Again, in the exemplary embodiment, the resistors 38 and 40 were each of a value at 60.4 kilohms. With that relationship, the inclusion of the resistor 52 in the feedback circuit produces a hysteresis of substantially 0.7 volts. Thus a lower trip-point is established at substantially 6.8 volts at the output terminal of the battery. Thus with the switch 54 connected in the upper position to include the resistor 52 in the feedback loop, the upper trip-point for the voltage detector is established at the original 7.5 volts, at which point the charging circuit will convert from a high charging rate to a trickle charging rate. When the battery has discharged to the point of exhibiting 6.8 volts at the output terminal thereof, the lower trip-point will be reached at which time the charging circuit will convert from the trickle charge to the higher charging rate.

The LED 18 serves two purposes; one, it establishes an operating bias for the transistor 8 whenever the transistor 26 is turned on. Second, the LED is illuminated whenever the transistor 8 is turned on, thereby providing an indication of the higher charging rate.

The diode 6 provides an isolation for the battery from the charging circuit, to prevent the battery from discharging into the charging circuit whenever there is a power-down condition of the main power supply connected to the terminal 12. It should be noted, however, that the diode 6 is not included in the sensing loop of the voltage detector. It is understood that the actual voltage characteristics across the diode such as the diode 6 are unstable introducing irregularities in the trip-point if such a diode were included in the sensing circuit. Inasmuch as the voltage detector 32 draws negligible current either in the energization thereof or in the input circuit thereof, there is no need to isolate the voltage detector from the battery whenever the main power supply failed. Thus the inclusion of the voltage detector module 32, of the type hereinbefore set forth, allows the improvement of the operating characteristic of the battery charger on two different bases. First because of the very low current drain of the voltage detector module, it may be connected directly across the battery terminals without the inclusion of an isolating diode with its inherent instabilities. Second, the voltage detector itself exhibits a very stable and very accurate response characteristic to the sensed voltage, thereby producing a highly accurate and stable two-mode operation of the battery charger.

The embodiments of the invention in which an exclusive property or privilege is claimed are defined as follows:

1. A battery charger circuit comprising:
   a pair of terminals for connection to a battery,
   a source of charging current for said battery,
   control means connected between said source and said terminals for controlling the charging current from said source to said battery,
   a voltage sensing circuit, including a voltage detector module, connected to said pair of terminals to be responsive to the terminal voltage of said battery, said voltage detector being characterized by having a negligible current drain,
   said control means including a first means for controlling said charging current in a first mode at a relatively high rate, and second means for controlling said charging current in a second mode at a relatively low rate,
   said control means being connected to be responsive to an output signal from said voltage sensing circuit for controlling the mode of operation in accordance with the sensed terminal voltage at said battery terminals.

2. A battery charging circuit comprising:
   a pair of terminals for connection to a battery,
   a source of charging current for said battery, a control circuit connected between said source and said terminals for controlling the charging current from said source to said battery, a voltage sensing circuit, including a voltage detector module, connected to said pair of terminals to be responsive to the terminal voltage of said battery, said voltage detector module having an input terminal and an output terminal and being characterized by having a negligible current drain, said voltage detector being further characterized in having a predetermined threshold voltage characteristic at said input terminal at which voltage the signal condition at said output terminal changes state, said voltage sensing circuit including a passive voltage dividing network connected across said pair of terminals with an intermediate connection to said input terminal of said module, said control circuit including a first means for controlling said charging current in a first mode at a relatively high rate, and a second means for controlling said charging current in a second mode at a relatively low rate, said control circuit being connected to be responsive to said signal condition at said output terminal of said module for controlling said charging current in said first mode whenever said voltage at said input terminal of said module is below said threshold voltage and for controlling said charging current in said second mode whenever said voltage at said input terminal of said module is equal to or above said threshold voltage.

3. A battery charging circuit comprising:
a pair of terminals for connection to a battery,
a source of charging current for said battery,
a control circuit connected between said source and said terminals for controlling the charging current from said source to said battery,
a voltage sensing circuit, including a voltage detector module, connected to said pair of terminals to be responsive to the terminal voltage of said battery, said voltage detector module having an input terminal and an output terminal and being characterized by having a negligible current drain, said voltage detector being further characterized in having a predetermined threshold voltage characteristic at said input terminal at which voltage the signal condition at said output terminal changes state, said voltage sensing circuit including a passive voltage dividing network connected across said pair of terminals with an intermediate connection to said input terminal of said module,
said control circuit including a switching transistor and a shunt connected resistor for controlling said charging current in a first mode at a relatively high rate through said transistor when said transistor is conductive and in a second mode at a relatively low rate through said resistor when said transistor is nonconductive,
said control circuit being connected to be responsive to said signal condition at said output terminal of said module for controlling said charging current in said first mode whenever said voltage at said input terminal of said module is below said threshold voltage and for controlling said charging current in said second mode whenever said voltage at said input terminal is equal to or above said threshold voltage.

4. A battery charging circuit comprising:
a pair of terminals for connection to a battery,
a source of charging current for said battery,
a control circuit connected between said source and said terminals for controlling the charging current from said source to said battery,
a voltage sensing circuit, including a voltage detector module, connected to said pair of terminals to be responsive to the terminal voltage of said battery, said voltage detector module having an input terminal and an output terminal and being characterized by having a negligible current drain, said voltage detector being further characterized in having a predetermined threshold voltage characteristic at said input terminal at which voltage the signal condition at said output terminal changes state, said voltage sensing circuit including a passive voltage dividing network connected across said pair of terminals with an intermediate connection to said input terminal of said module,
said control circuit including means for controlling said charging current in a first mode at a relatively high rate and for controlling said charging current in a second mode at a relatively low rate,
said control circuit being connected to be responsive to said signal condition at said output terminal of said module for controlling said charging current in said first mode whenever said voltage at said input terminal of said module is below said threshold voltage and for controlling said charging current in said second mode whenever said voltage at said input terminal of said module is equal to or above said threshold voltage.

5. A battery charging circuit as set forth in claim 4 wherein said voltage sensing circuit includes a selectively operable means for introducing hysteresis into the response characteristic in said sensing circuit whereby the transfer of said control of said charging current from said first mode to said second mode is at a different level of terminal voltage of said battery than is the transfer of control of said charging current from said second mode to said first mode.

6. A battery charging circuit as set forth in claim 5 wherein said selectively operable means includes a feedback circuit connected between output circuit means of said module and the input terminal of said module, said feedback circuit including a feedback impedance means and switch means for selectively switching said feedback circuit into operative circuit relationship.

7. A battery charging circuit comprising:
a pair of terminals for connection to a battery,
a source of charging current for said battery,
a control circuit connected between said source and said terminals for controlling the charging current from said source to said battery,
a voltage sensing circuit, including a voltage detector module, connected to said pair of terminals to be responsive to the terminal voltage of said battery, said voltage detector module having an input terminal and an output terminal and being characterized by having a negligible current drain, said voltage detector being further characterized in having a predetermined threshold voltage characteristic at said input terminal at which voltage the signal condition at said output terminal changes state, said voltage sensing circuit including a passive voltage dividing network connected across said pair of terminals with an intermediate connection to said input terminals of said module, said control circuit including a switching transistor and a shunt connected resistor for controlling said charging current in a first mode at a relatively high rate through said transistor when said transistor is conductive and in a second mode at a relatively low rate through said resistor when said transistor is nonconductive, said control circuit further including a driver transistor the input of which is connected to said output terminal of said module and the output of which is connected to the control input of said switching transistor controlling said charging current in said first mode whenever said voltage at said input terminal of said module is below said threshold voltage and for controlling said charging current in said second mode whenever said voltage at said input terminal of said module is equal to or above said threshold voltage, and said voltage sensing circuit further including a selectively operable feedback circuit connected between said output of said driver transistor and said input terminal of said module for introducing a selectively operable hysteresis into the response characteristic in said sensing circuit whereby the transfer of said control of said charging current from said first mode to said second mode is at a different level of terminal voltage of said battery than is the transfer of control of said charging current from said second mode to said first mode, said feedback circuit including a feedback impedance means and a switch means for selectively switching said feedback circuit into operative circuit relationship.

* * * * *